May 23, 1972   J. C. MORIN   3,664,642
MIXING APPARATUS
Filed July 17, 1970                                12 Sheets-Sheet 2

INVENTOR
JOSEPH C. MORIN

May 23, 1972    J. C. MORIN    3,664,642
MIXING APPARATUS
Filed July 17, 1970    12 Sheets-Sheet 5
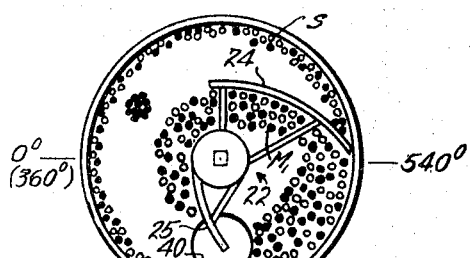
fig. 2F.
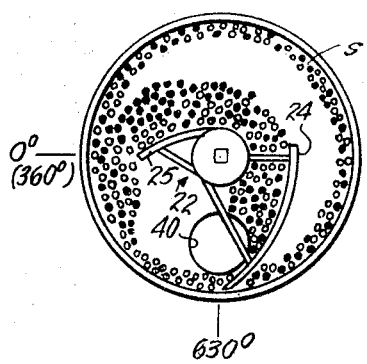
fig. 2G.
fig. 2H.
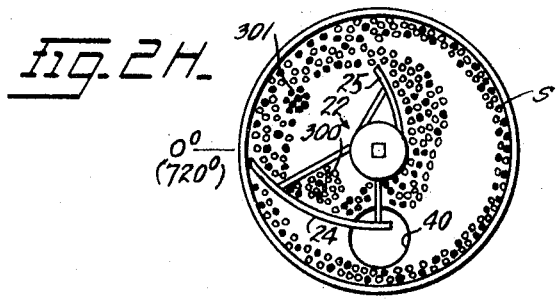
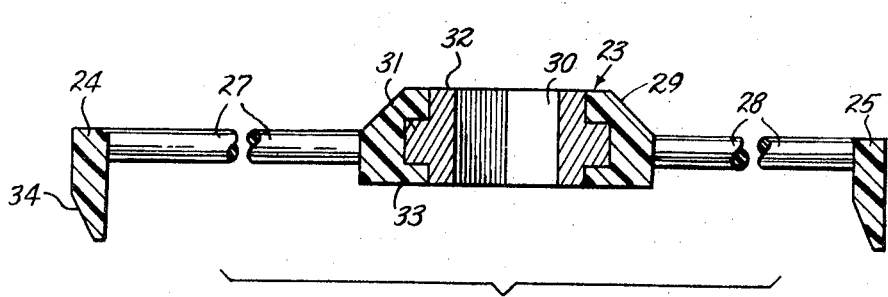
fig. 12.
INVENTOR
JOSEPH C. MORIN

INVENTOR
JOSEPH C. MORIN

May 23, 1972   J. C. MORIN   3,664,642
MIXING APPARATUS
Filed July 17, 1970   12 Sheets-Sheet 6

INVENTOR
JOSEPH C. MORIN

May 23, 1972 J. C. MORIN 3,664,642
MIXING APPARATUS
Filed July 17, 1970 12 Sheets-Sheet 7

INVENTOR
JOSEPH C. MORIN

May 23, 1972  J. C. MORIN  3,664,642
MIXING APPARATUS
Filed July 17, 1970  12 Sheets-Sheet 8

INVENTOR
JOSEPH C. MORIN

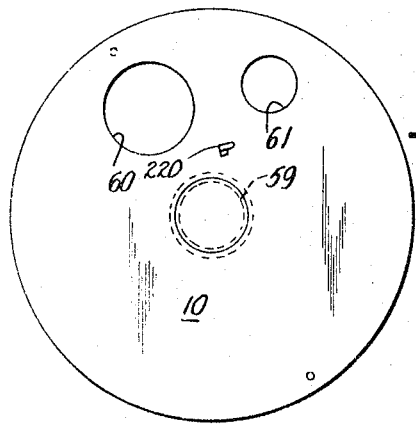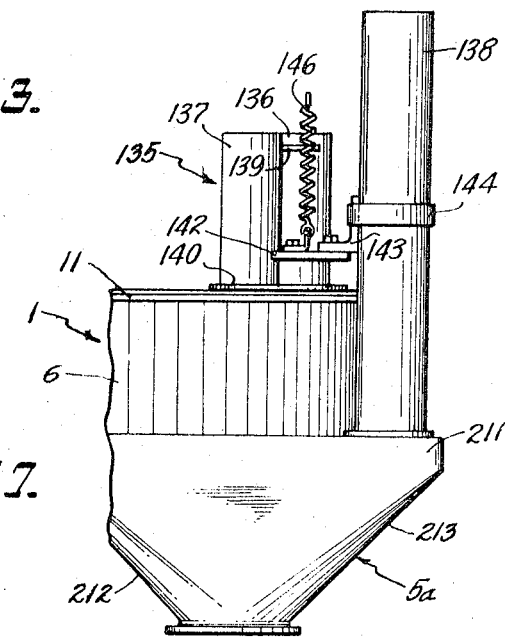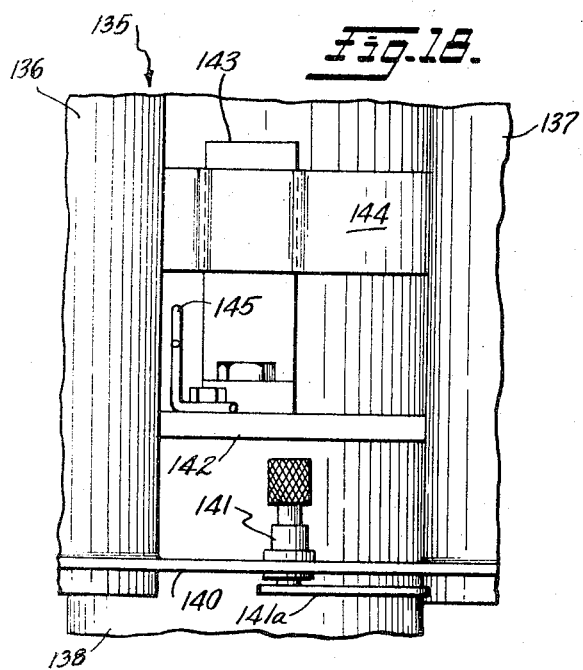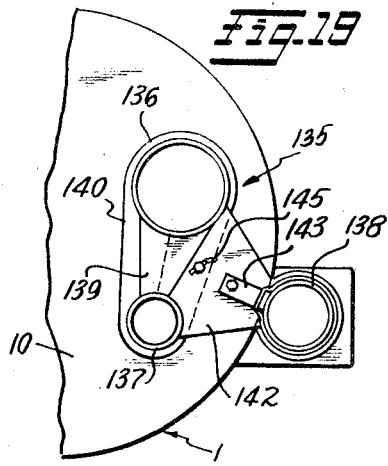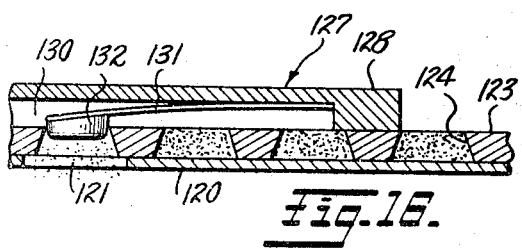

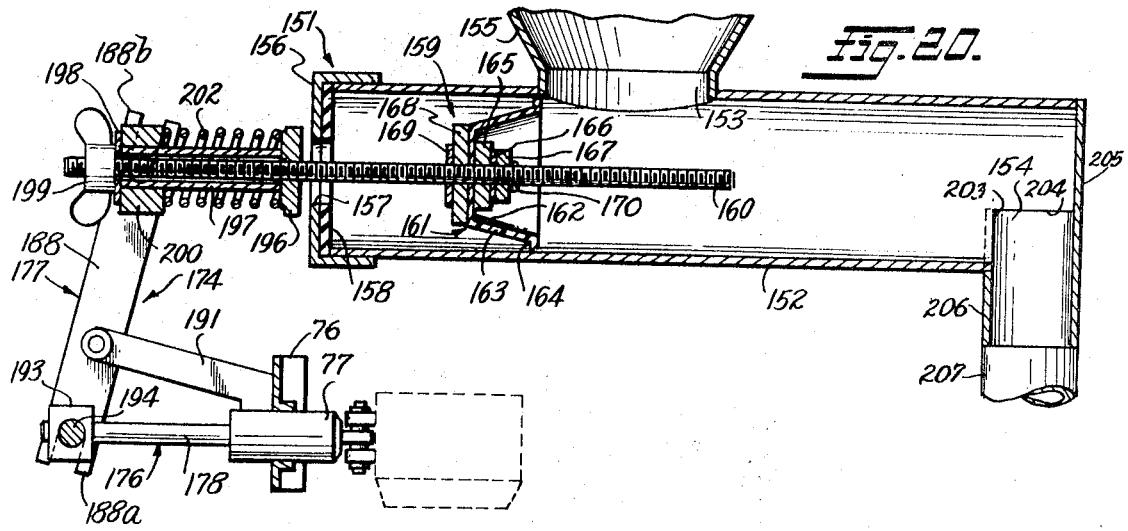
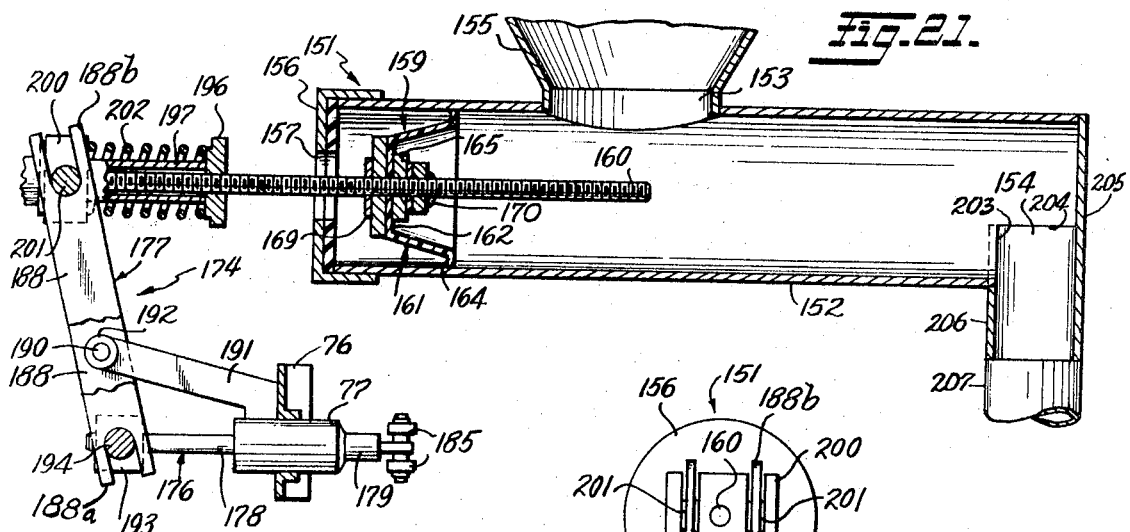
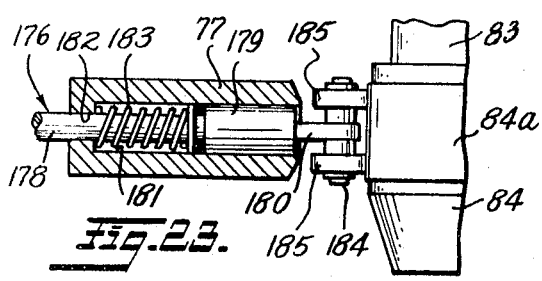

INVENTOR
JOSEPH C. MORIN

United States Patent Office 3,664,642
Patented May 23, 1972

3,664,642
MIXING APPARATUS
Joseph C. Morin, Northville, Mich., assignor to Application Engineering Corp., Elk Grove, Ill.
Filed July 17, 1970, Ser. No. 55,926
Int. Cl. B01f 7/20
U.S. Cl. 259—8                               8 Claims

ABSTRACT OF THE DISCLOSURE

In a multi-stage mixing apparatus, typically for mixing particulate polymeric materials with colorants, characterized by a mixing unit having a housing which can be moved between an operative position and a laterally displaced position, the interior of the housing being divided into a plurality of mixing zones by a series of pans nested in the housing, each pan being equipped with a mixing and advancing rotor, and the rotors and pans being easily removed, for cleaning, and replaced when the housing is in its laterally displaced position. The pans are identical and the rotors are identical, and special provision is made to allow the pans and rotors be replaced without requiring special skill and attention on the part of the operator.

---

This invention relates to mixing apparatus and especially to rotary mixers for mixing materials, such as colorants, which require that the apparatus be completely clean at the start of the mixing operation.

In the mixing of polymeric materials with colorants, for example, it is necessary to remove essentially all residual material from the portions of the apparatus which contact the mixture before commencing a mixing operation, else the desired color will not be achieved. While various types of apparatus have been proposed which are more or less suitable from the standpoint of carrying out mixing, such apparatus have been relatively difficult to clean and have therefore been unduly costly because of excessive down time and waste of materials.

It is accordingly an object of the invention to provide such a mixing apparatus which can be more quickly and easily cleaned and prepared for operation than has heretofore been possible.

Another object is to devise a multi-stage rotary mixer wherein the parts making up the several stages can be easily and quickly removed, cleaned, and re-installed.

A further object is to provide such an apparatus wherein the parts defining the mixing stages are interchangeable and can be assembled only in a single inter-related proper combination so that a minimum of skill and attention is required during cleaning and re-assembly.

Stated generally, mixers according to the invention comprise frame means supporting a multi-stage mixing unit, means for supplying flowable materials to the mixing unit, and means for delivering the mixture from the mixing unit, the mixing unit being movable between an operative position and an inactive position. The mixing unit comprises a single housing in which a plurality of pans are disposed in an upright series to define a plurality of mixing chambers each equipped with an agitator, the pans and agitators being removable from the housing when the mixing unit is in its inactive position. Advantageously, the agitators are identical, and the pans, each equipped with a bottom discharge opening, are also identical, the pans and the housing being equipped with locator means in such fashion that the pans can only be assembled in the housing in one fashion which assures that the discharge openings will be properly positioned relative to each other and to the housing.

In order that the manner in which the foregoing and other objects are attained in accordance with the invention can be understood in detail, particularly advantageous embodiments thereof will be described with reference to the accompanying drawings, which form a part of the original disclosure hereof and wherein:

FIG. 9 is a side elevational view of the mixing unit of FIG. 7, with parts broken away for clarity of illustration;

FIG. 11 is a top plan elevational view of one of the rotors of the mixing unit of FIG. 7;

FIG. 12 is a sectional view taken generally on line 12—12, FIG. 11;

FIG. 13 is a top plan elevational view of the top for the mixing unit of FIG. 7;

FIG. 16 is an enlarged fragmentary vertical sectional view taken generally on line 16—16, FIG. 15;

FIG. 17 is a fragmentary side elevational view of a portion of the apparatus of FIGS. 3 and 4;

FIG. 18 is an enlarged fragmentary side elevational view of a portion of the structure seen in FIG. 17;

FIG. 19 is a top plan view of the structure shown in FIG. 17;

FIGS. 20 and 21 are longitudinal sectional views, showing movable parts in different positions, of a recycle feeder forming part of the apparatus of FIGS. 3 and 4;

FIG. 22 is an end elevational view of the device of FIGS. 20 and 21;

FIG. 23 is a fragmentary side elevational view, with a slide bearing broken away for clarity, showing the manner in which the device of FIGS. 20 and 21 is actuated;

Figure 1:
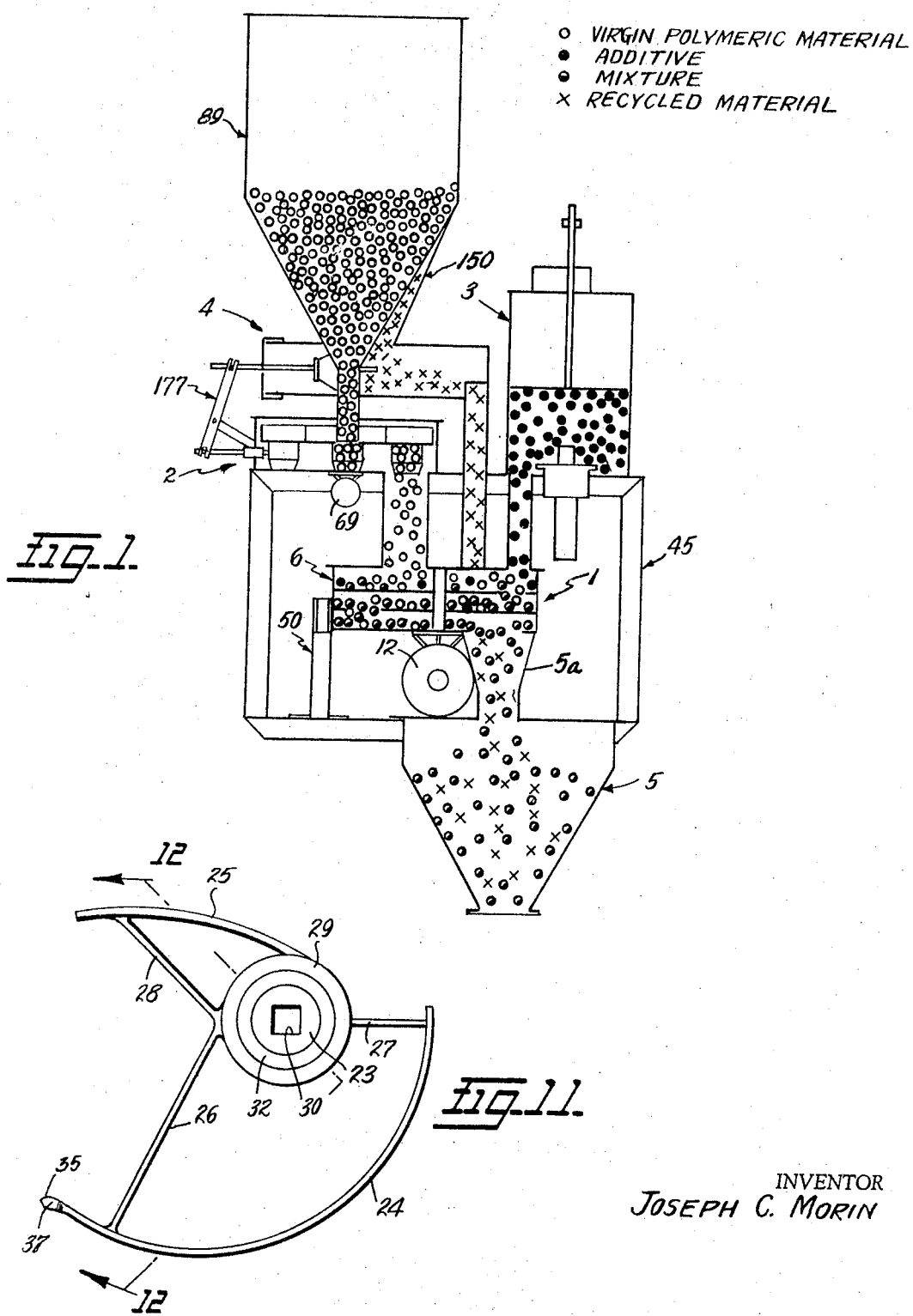
FIG. 1 is a schematic diagram illustrating one embodiment of the invention.
Figure 3:
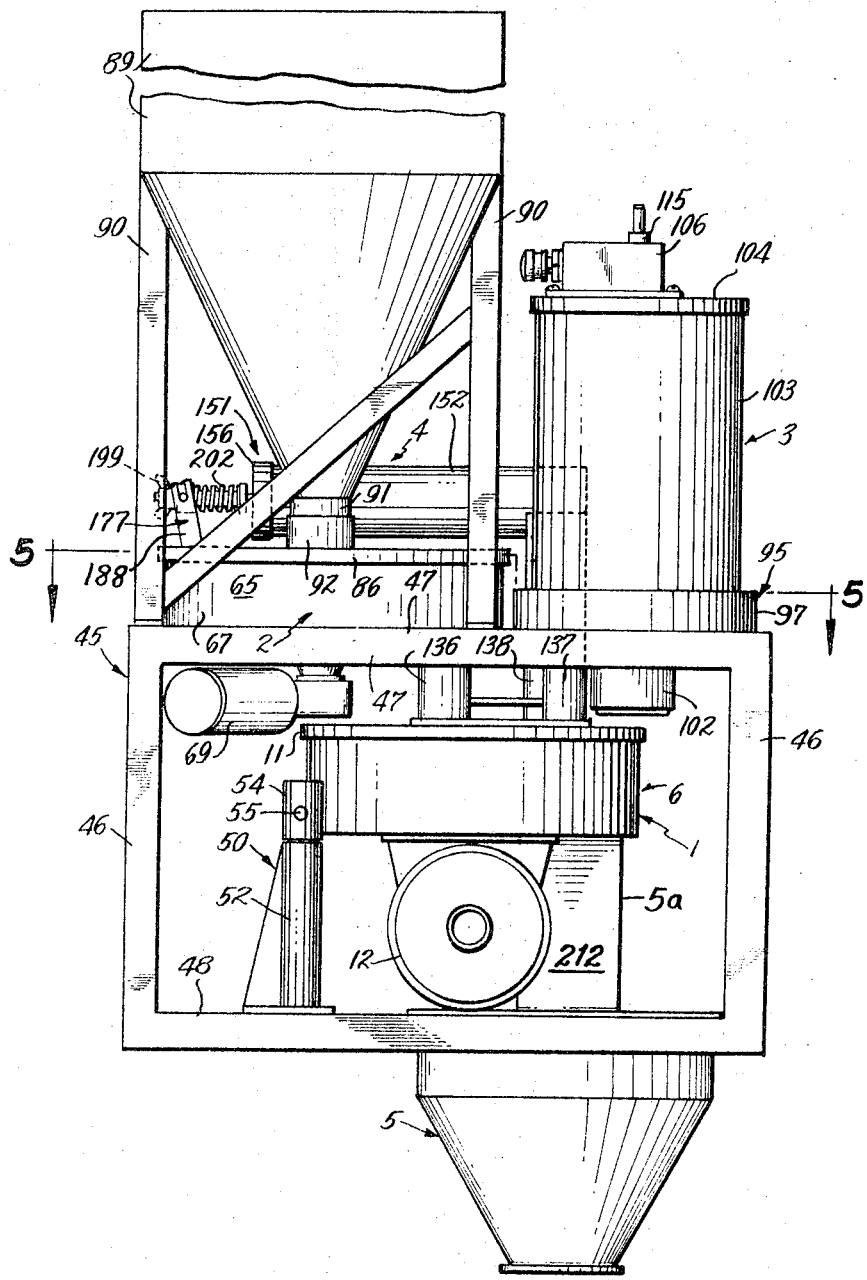
FIGS. 3 and 4 are side elevational views of one apparatus embodiment of the invention.
Figure 4:
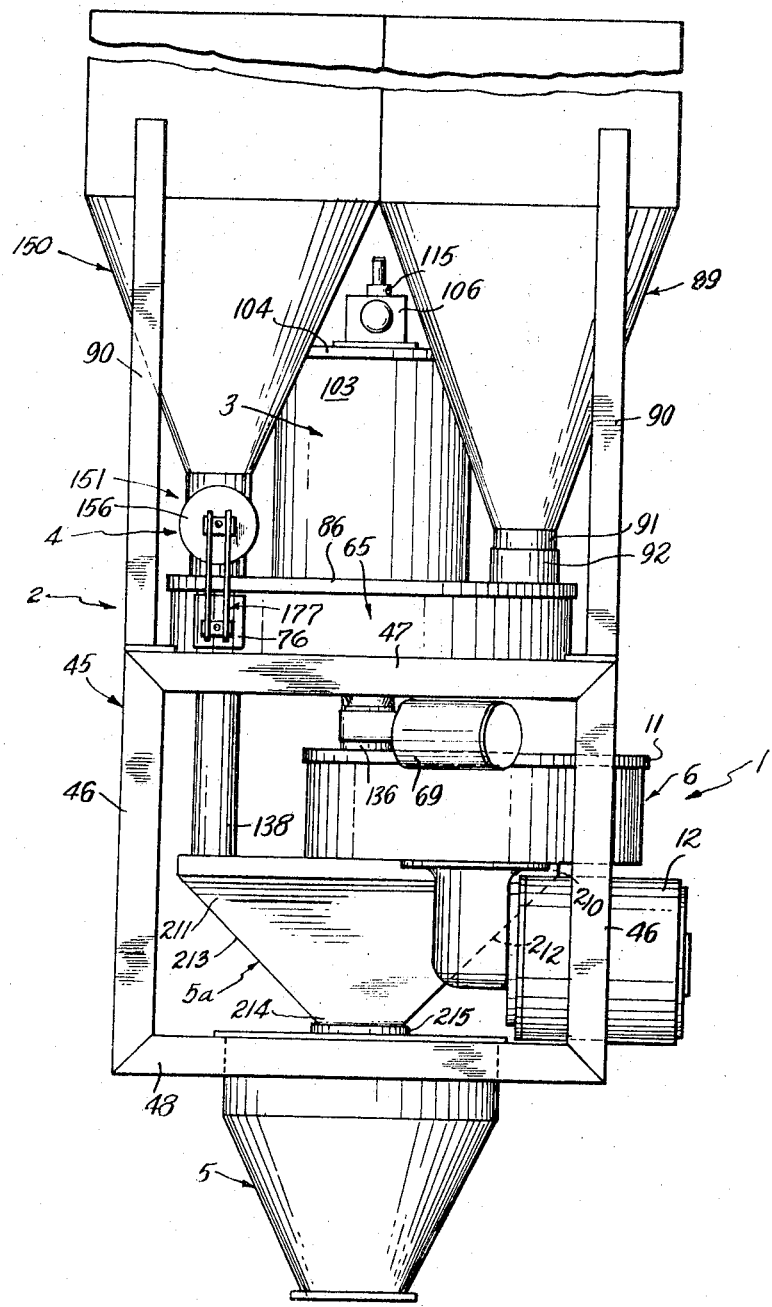

Referring now to the drawings in detail, one advantageous apparatus embodiment of the invention will first be described as a background to description of method embodiments. Referring to FIGS. 1, 3 and 4, the apparatus can comprise a mixing assembly 1, a first feeding unit 2, a second feeding unit 3, a recycle feeding unit 4, and a product delivery hopper 5. For purposes of explanation, assume that the apparatus is to be employed according to method embodiments of the invention for mixing virgin polymeric material, supplied in larger particulate form by feeding unit 2, with a more finely particulate colorant, supplied by feeding unit 3, the final mixture being converted to shaped polymeric products, as by a molding machine (not shown) supplied from hopper 5, the scrap being reground and recycled via recycle feeding unit 4.

MIXING ASSEMBLY

As seen in FIGS. 7–12, the mixing assembly 1 comprises a main housing including an upwardly opening cylindrical cup-shaped main portion 6 in which are disposed three relatively shallow pans 7–9, the housing being closed by a cover 10 secured to the upper rim of portion 6 by a band-type clamp 11. A drive motor 12 is disposed below the bottom of housing portion 6, being mounted directly thereon, and drives an upright shaft 13 of square transverse cross-section. Pans 7–9 are identical and, as will be clear from FIGS. 7 and 10, have an outer diameter such that the pans can nest, one atop another, in main housing portion 6, with the outer periphery of each pan being embraced by the upright side wall 14 of portion 6, and with the outer peripheral portion 15, FIG. 10, of the bottom of each pan resting directly on the upper edge 16, FIG. 10, of the side wall of the next lower pan. The pans 7–9 have central hubs 17–19, respectively, with each such hub having a circular opening through which the shaft 13 freely extends. Thus, the pans 7–9 are stationary, being nested in and supported by housing portion 6, and each pan presents a horizontally disposed annular mixing zone defined by the outer side wall, the hub, and the portion of the bottom wall extending between the outer side wall and hub, such mixing zone being closed at its top by the bottom wall of the next higher pan or, in the case of the uppermost pan 9, by cover 10.

The pans 7–9 are equipped respectively with advancing and mixing units 20–22, FIGS. 7 and 10–12. The three units 20–22 are in all respects identical, including a metal central hub 23, FIG. 12, and an integral arm structure comprising an outboard arm 24 and an inboard arm 25, supporting rods 26–28, and a hub portion 29, the combination of arms 24, 25, rods 26–28, and hub portion 29 being formed as an integral piece, advantageously from a rigid polymeric material having high strength and resistance to abrasion, as well as a low coefficient of friction. One suitable class of such materials, for example, is the acetal homopolymers. Hub 23 has a straight through-bore 30 of square transverse cross-section of such size as to slidably accommodate shaft 13 so that each unit 20–22 can be slid over the upper end of the shaft and, with the walls of bore 30 embracing the shaft, will be in driven relation therewith. The outer surface of hub 23 is cylindrical save for an outwardly projecting transverse flange 31 spaced from the ends of the hub. Hub portion 29 is molded about hub 23, so that flange 31 is wholly embedded in hub portion 29. The combination of metal hub 23 and hub portion 29 presents a flat upper surface 32 and a flat lower face 33, FIG. 12, for flush engagement with the adjacent surface of the respective hubs 17–19 of the pans 7–9 in the assembled unit.

Outboard arm 24 is arcuate, outwardly convex and so disposed, and of such dimensions that, in the final mixing assembly, the trailing end of arm 24 is located slightly inwardly of the center line of the annular mixing zone presented by the corresponding one of pans 7–9, and the leading end of arm 24 is disposed immediately adjacent to the side wall 14 of the pan, with the arm slanting forwardly and outwardly across the mixing zone afforded by the pan. Rod 26 extends between the hub of the unit and a point on arm 24 near the trailing end of the arm. Rod 27 extends between the hub and a point on arm 24 between the middle of the arm and the leading end thereof.

Arm 24 is of substantial thickness, adequate for the required strength, and has a vertical height which is a predominant proportion of the effective depth of the one of the pans 7–9 in which the arm is to operate. Thus, for example, the depth of the pans may be on the order of 1 3/16" and the height of arm 24, and the equal height of inboard arm 25, may be 1 1/16". The flat bottom edges of both arms 24 and 25 lie in a common plane at right angles to the axis of bore 30, the trailing surface of each arm being slanted, as at 34, FIG. 12, so that the width of the bottom edges is small in comparison to the thickness of the arm.

Figure 10:
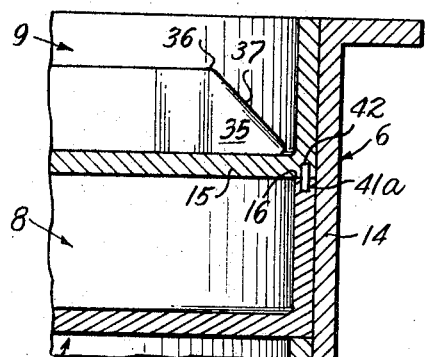
FIG. 10 is an enlarged fragmentary sectional view of a portion of the mixing unit of FIG. 7.

As best seen by comparing FIGS. 10 and 11, the leading end portion of arm 24 has a front surface 35 which curves outwardly and rearwardly, terminating in essentially radial relation to the inner surface of pan side wall 14. At this end portion of the arm, the upper edge of the arm turns downwardly, as seen at 36, FIG. 10, so that the end portion 37 of the upper edge slants downwardly and outwardly at for example, an angle of approximately 45°. The extreme tip of the leading end of arm 24 is spaced a small distance, typically 0.01–0.025", inwardly from pan side wall 14 in the completed assembly.

Inboard arm 25 is arcuate and outwardly convex, the leading end thereof being joined directly to the periphery of hub portion 29 and the trailing end being spaced outwardly from the hub so as to be located approximately midway between the hub and outer wall 14 of the pan, in the completed assembly. Rod 28 extends between the hub and the trailing end portion of arm 25.

Figure 7:
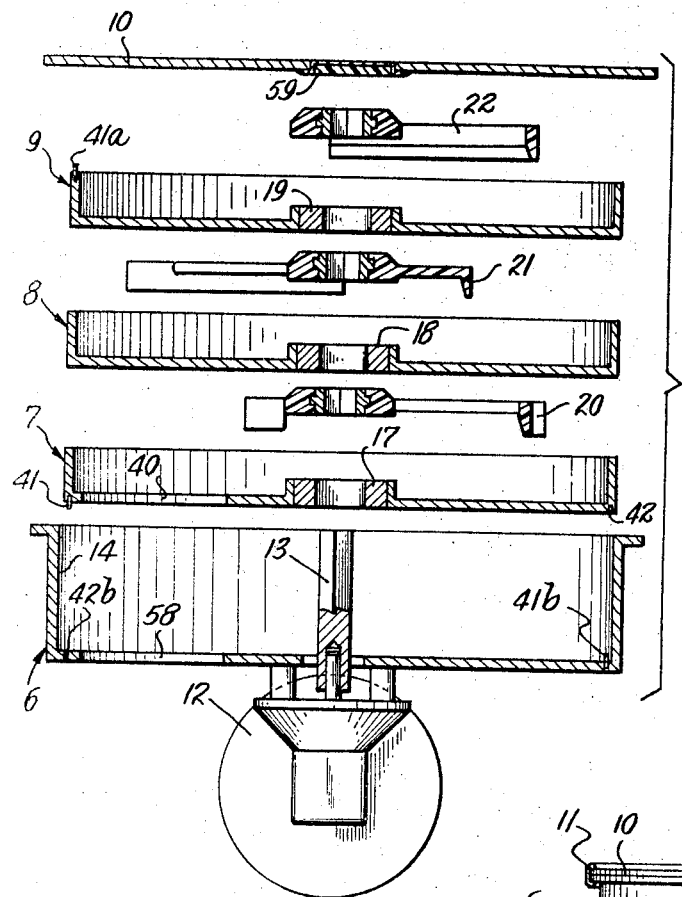
FIG. 7 is an exploded view, primarily in vertical section, of the mixing unit of the apparatus of FIGS. 3 and 4.
Figure 8:
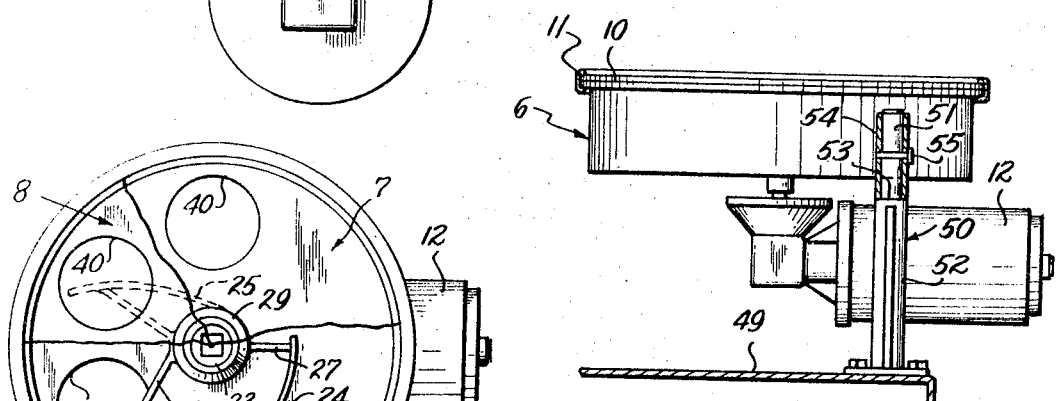
FIG. 8 is a top plan view of the mixing unit of FIG. 7.
Figure 8:
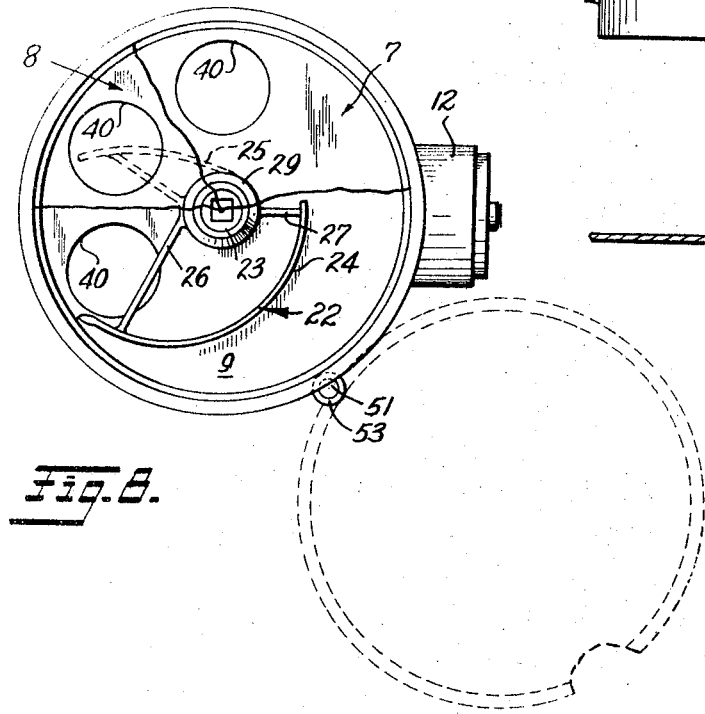

Each pan 7–9 includes a circular discharge opening 40, FIG. 8, in the bottom wall thereof, the diameter of the opening being a substantial proportion of the width of the space between the hub of the advancing and mixing unit and outer pan wall 14. Each pan 7–9 is equipped with a downwardly projecting locator pin 41, FIGS. 7 and 7A, and a downwardly opening locator recess 42, the pin 41 and recess 42 of each pan being located on that diameter of the pan which extends through the center of the discharge opening 40 of the pan. Each pan 7–9 also includes an upwardly projecting locator pin 41a and an upwardly opening locator recess 42a, the pin 41a and recess 42a of each pan being located on a diameter of the pan which is displaced, e.g., 60°, clockwise as viewed from above, from the diameter on which the pin 41 and recess 42 of that pan are located. The bottom wall of housing member 6 is provided with a discharge opening 58, a locator opening 42b and an upwardly projecting locator pin 41b, the opening 42b and pin 41b being located on the diameter of member 6 which extends through the center of discharge opening 58. Cover 10 is equipped with a downwardly projecting locator pin 41c and has a locator opening 42c, the pin 41c and opening 42c lying on the diameter of cover 10 which extends through the center of larger opening 60. The various locator pins, recesses and openings are all spaced from the central axis of the assembly by the same radial distance. Accordingly, the pans 7–9 can be assembled in housing member 6, and cover 10 applied, with the respective locator pins and recesses or openings engaged, with the result that while opening 40 of pan 7 is registered with opening 58 of member 6, all other openings 40, and opening 60, are angularly displaced from each other by, e.g., 60°.

The apparatus includes a main frame, indicated generally at 45, FIGS. 3 and 4, which is rectangular in side elevation and in plan; the frame comprising corner uprights 46, horizontal top members 47, and horizontal bottom members 48. A flat floor structure 49, FIG. 9, extends between bottom members 49. Rigidly secured to floor structure 48 at a location at one side of the frame is an upright post 50 having a top right cylindrical portion 51 of smaller diameter and a lower portion 52 of larger diameter joining at a transverse annular upwardly facing shoulder 53. A sleeve 54 is welded or otherwise rigidly secured to the outer surface of side wall 14 of main housing member 6 and has a right cylindrical inner surface, such as to slidably embrace top portion 51 of post 50. The lower end of sleeve 54 has a transverse annular face disposed for flush sliding engagement with shoulder 53. Accordingly, when sleeve 54 is placed on post portion 51, the post 50 supports housing member 6, and thus the entire mixing assembly 1, for horizontal swinging movement between the operative position of the mixing assembly, seen in FIGS. 3 and 4 and in solid lines in FIG. 8, and an exposed position, shown in broken lines in FIG. 8. When in the exposed position, the entire mixing assembly 1 is located outside of frame 45, for purpose of easy disassembly and cleaning as later described. Upper post portion 51 and sleeve 54 are provided with transverse apertures which align to accept a locking pin 55, FIG. 9, when the mixing assembly 1 is in its operative position, so that, during operation, the mixing assembly is securely positioned relative to other parts of the apparatus.

Figure 7A:
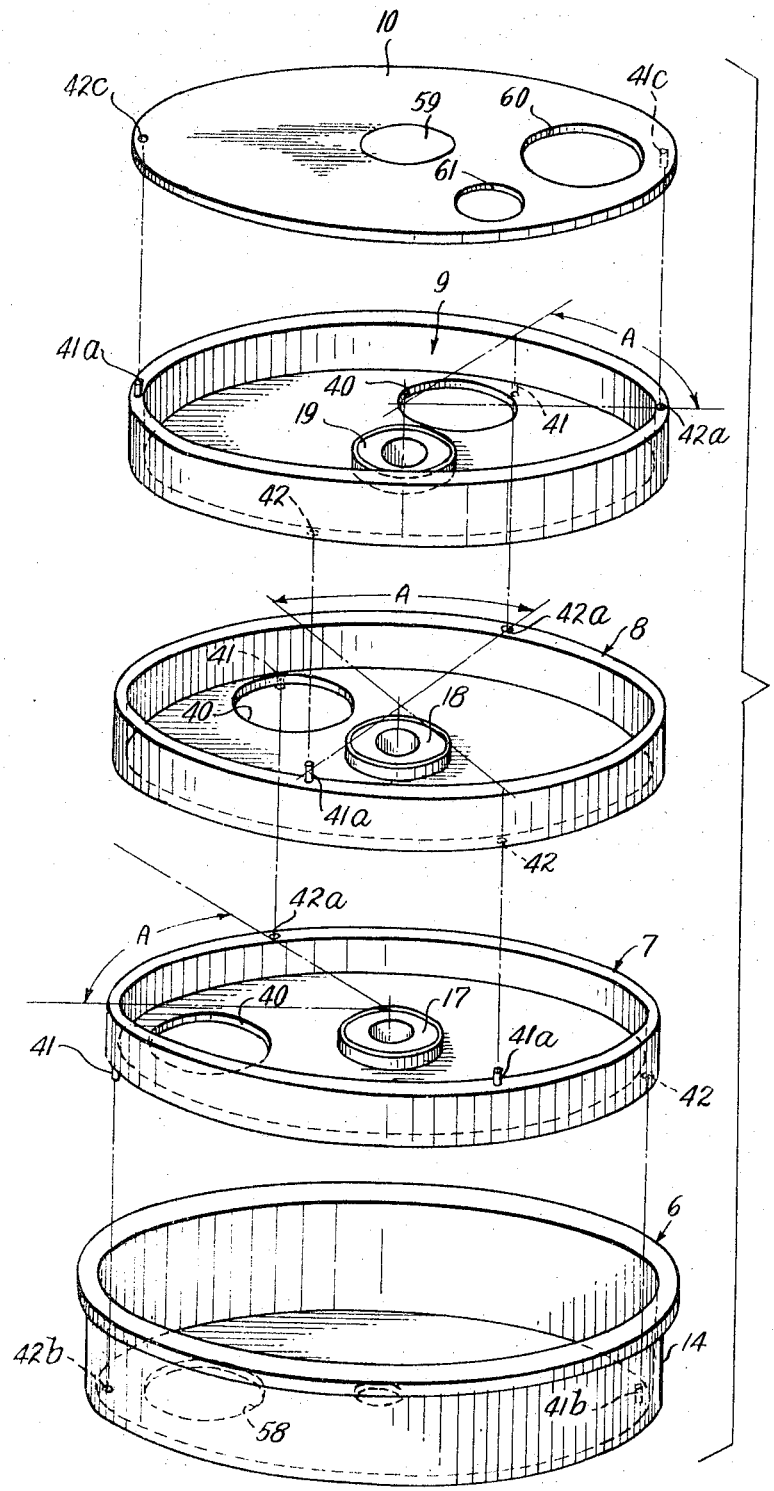
FIG. 7A is an exploded sectional view showing interrelation of the mixing pans of the unit of FIG. 7.

FIGS. 7 and 7A illustrate the manner in which the mixing assembly 1 is assembled. With main housing member 6 in its exposed position, pan 7 is lowered into member 6, with shaft 13 extending through hub 17, and rotated until pin 41b engages in recess 42 of pan 7 and pin 41 of pan 7 engages in opening 42b, discharge opening 40 of pan 7 thus registering with discharge opening 58, and the bottom wall of pan 7 being brought into flush engagement with the bottom wall of member 6. Advancing and mixing unit 20 is then lowered into place, with shaft 13 projecting through the bore 30 thereof and with bottom surface 33 of the hub seated on the upper surface presented by hub 17 of pan 7. Pan 8 is then lowered into place and adjusted rotationally until its locator pin 41 engages in the recess 42a, FIG. 7A, of pan 7 and the pin 41a of pan 7 engages in the recess 42 of pan 8, so that the proper angular displacement between the discharge openings 40 of pans 7 and 8 is assured. Advancing and mixing unit 21 is then installed in pan 8 in the same manner just described for installation of unit 20. Pan 9 is then installed, with rotational adjustment to bring its locator pin 41 into engagement with recess 42a of pan 8 and pin 41a of pan 8 into engagement in recess 42 of pan 9, so that the discharge openings of pans 8 and 9 are properly angularly displaced from each other. The advancing and mixing unit 22 is next installed in pan 9, with shaft 13 terminating just below upper surface 32 of the hub of unit 22 once that hub has seated on hub 19 of pan 9. Finally, cover 10 is applied, rotated to engage its pin 41c in opening 42a of pan 9 and to engage pin 41a of pan 9 in opening 42c of the cover, and is secured by the band clamp 11. In this connection, a shallow plain bearing 59 is secured to the central portion of the bottom face of cover 10, the configuration of bearing 59 being such as to embrace the upper end portion of the hub of advancing and mixing unit 22. Thus, with cover 10 clamped to the rim of housing member 6, bearing 59 acts to accept any radial forces which may develop in the combination of shaft 13 and units 20–22, and also to provide an axial clamping force to the combination of pans and advancing and mixing units.

As seen in FIG. 13, the smaller opening 61 is spaced forwardly (with reference to the clockwise direction of movement of shaft 13 and units 20–22) and outwardly from the larger opening 60.

FEEDING UNIT 2

Feeding unit 2 can be considered as the primary feed for the apparatus, usually feeding at a higher rate than feeding unit 3. Unit 2 comprises a main housing member 65, FIG. 6, which has a flat bottom wall 66 and a right cylindrical side wall 67, member 65 being rigidly secured to a floor 68 supported by upper horizontal members 47 of frame 45. A drive motor 69 is located below floor 68 and mounted rigidly thereon in any suitable fashion, the shaft 70 driven by the motor projecting vertically upwardly through central openings in the floor 68 and wall 66. Above bottom wall 66, shaft 70 is equipped with a rigidly attached enlarged portion 71 of square transverse cross-section. Housing member 65 is provided with a circular discharge opening 72 registered with a like opening in floor 68, the two openings accommodating the upper end of a cylindrical discharge sleeve 73 secured to bottom wall 66. A circular upright partition 74, is secured to and projects upwardly a short distance from bottom wall 66, partition 74 being concentric with shaft 70 and of a height which is small as compared to that of side wall 67, discharge opening 72 being located between partition 74 and the side wall 67. Side wall 67 is provided with a port which is closed by a closure plate 76, FIGS. 4 and 20, supporting a horizontally extending cylindrical slide bearing 77, FIGS. 20 and 23, for a purpose later described.

Figure 5:
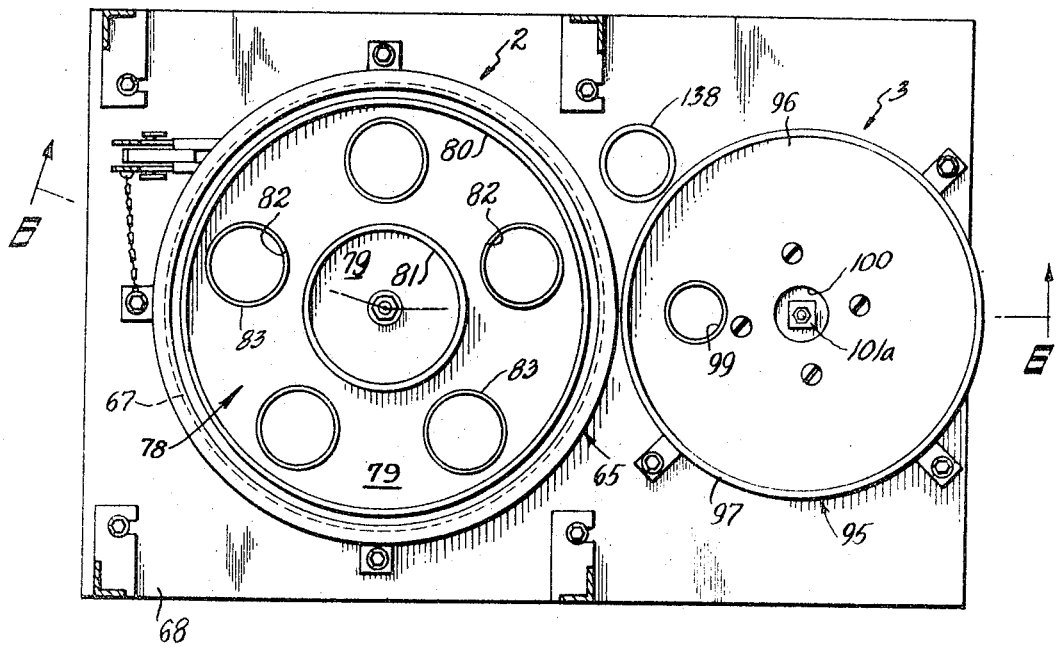
FIG. 5 is a transverse sectional view, taken generally on line 5—5, FIG. 3, with some parts omitted for clarity and with other parts shown in top plan elevation.
Figure 6:
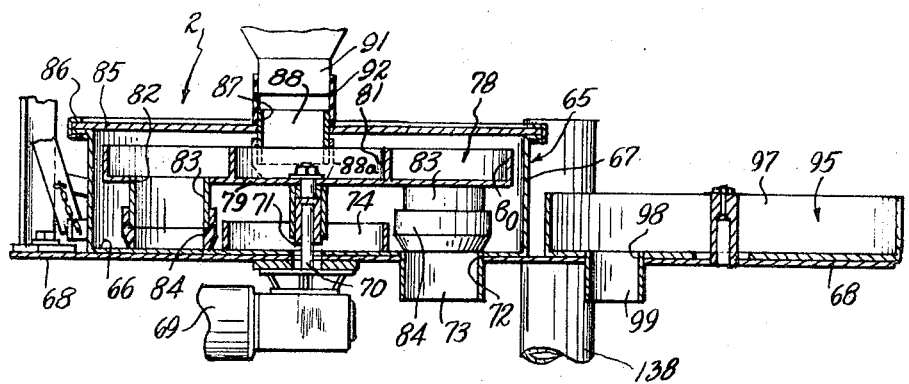
FIG. 6 is a vertical sectional view taken generally on line 6—6, FIG. 5.

Disposed in housing member 65 and driven by motor 69 is a metering rotor 78, FIGS. 5 and 6, comprising a flat circular disc 79 having an upstanding peripheral wall 80 and a circular upright partition 81. The diameter of disc 79 is slightly smaller than that of side wall 67 of housing member 65. Partition 81 is of substantially smaller diameter than, and is concentric with, peripheral wall 80, the relative dimensions being such that the radial space between walls 80 and 81 is substantially greater than the diameter of discharge opening 72. Secured to the center of disc 79 and depending at right angles therefrom is a socket member of square transverse cross-section and dimensioned to be slipped over the enlarged shaft portion 71 so as to embrace shaft portion 71 to establish a driving connection between the shaft and the metering rotor.

Disc 79 is provided with a plurality of identical openings 82, FIG. 5, arranged in an equally spaced circular series along the annular portion of disc 79 between wall 80 and partition 81. A plurality of identical right cylindrical drop tubes 83 are provided, the upper end of each tube 83 being disposed in a different one of openings 82 and rigidly secured to disc 79 in any suitable fashion. Tubes 83 depend from disc 79 and are of such length that, when the disc is properly mounted on shaft 70, the lower ends of tubes 83 are near but spaced significantly above bottom wall 66 of housing member 65. On the lower end of each drop tube 83, there is provided a sealing ring 84, the rings 84, FIGS. 6 and 23, being identical and including a relatively thick portion which embraces the end portion of the respective drop tube and is secured thereto, and a lower tip portion, the outer surface of which is tapered downwardly and inwardly so that the transverse annular end face of the ring is relatively narrow. The upper portion of each ring 84 is of a larger inner diameter, matching the outer diameter of the drop tube, while the lower end portion of the ring is of smaller inner diameter, matching the inner diameter of the drop tube, so that the ring in effect constitutes an extension of the drop tube. The combined length of the drop tube and its sealing ring is such that, when the rotor 78 is properly installed on shaft 70, the lower end faces of all of the rings 84 are in flush sliding engagement with the upper surface of bottom wall 66 of housing member 65. As will be apparent from FIG. 6, the location of the annular series of openings 82, and the corresponding drop tubes and sealing rings, is such that each sealing ring 84 crosses discharge opening 72 once during each rotation of shaft 70.

The sealing rings 84 are advantageously formed of a low friction, high strength polymeric material or an elastomeric material, and are clamped to drop tubes 83 by stainless steel band clamps 84a, FIG. 23. Whenever engaged with an unbroken portion of bottom wall 66, rings 84 are effective to prevent escape of particulate material from drop tubes 83. Assuming that the drop tubes 83 are full of a particulate material, then a predetermined amount of such material will be discharged through opening 72 each time one of the rings 84 sweeps across the discharge opening, the particular amount of material released depending upon the rotational speed of rotor 78 and the nature of the particulate material involved.

The top of main housing member 65 is closed by a flat circular cover 85 secured by a band clamp 86. Cover 85 is provided with a circular entrance opening 87, FIG. 6, in which is fitted and suitably secured a drop tube 88 equipped with a sealing ring 88a, as hereinbefore described with reference to rings 84, the effective combined lengths of tube 88 and ring 88a being such that the lower end of ring 88a is in flush sliding engagement with the upper surface of disc 79. A supply hopper 89 is disposed above housing member 65, being supported by upright frame members 90 which are secured to frame 45, as will be apparent from FIGS. 3 and 4. Hopper 89 is conventional, being equipped at its lower end with a vertically depending delivery tube 91. Hopper 89 is so disposed that the delivery tube is aligned above the space between wall 80 and partition 81 in the assembled unit. When cover 85 is applied, it is initially adjusted to bring tube 88 into coaxial alignment with delivery tube 91, the band clamp 86 then being applied to preserve this relationship. Tubes 88 and 91 are embraced and interconnected by a flexible connecting tube 92. Tubes 88 and 91 are of the same internal diameter equal to that of drop tubes 83. Particulate material flows from hopper 89 to fill the space defined by the combination of tube 91, tube 88 and ring 88a, further flow being prevented when the lower end of ring 88a engages an unbroken portion of disc 79. When rotation of disc 79 brings one of tubes 83 into registry with ring 88a, the particulate material flows into the space defined by the tube 83 and its sealing ring 84, essentially filling that space with material which remains in place, because of engagement between ring 84 and bottom wall 66, until the ring 84 rotates into registry with discharge sleeve 73. Sleeve 73 has an inner diameter somewat larger than that of ring 84, so that, once ring 84 registers with sleeve 73, all of the material confined by the combination of tube 83 and ring 84 is discharged through sleeve 73. Accordingly, as disc 79 rotates at constant speed, each tube 83 feeds to discharge sleeve 73 the same measured quantity of particulate material, that quantity depending upon the relative dimensions employed, the particle size and flow characteristics of the particulate material involved, and the speed of rotation of disc 79.

FEEDING UNIT 3

The second feeding unit, indicated generally at 3, comprises a shallow base pan 95 secured directly to floor 68 in an area immediately adjacent to housing member 65. Pan 95 includes a flat bottom wall 96 and a short upstanding peripheral wall 97. Bottom wall 96 has a central opening 100, and there is a corresponding central opening in floor 68, to freely accommodate the shaft 101 of an upright drive motor 102 which is mounted on floor 68 and depends therebelow. A cylindrical supply hopper body 103 is provided, this body having an open lower end and being disposed with that end resting upon bottom wall 96 of pan 95. The upper end of hopper body 103 is closed by a removable cover 104 which telescopes over the upper end of hopper body 103 and is provided with a central opening 105. A housing 106 is secured to the upper face of cover 104 and includes an opening 107 aligned with opening 105. A snap-acting electrical switch 108, equipped with an operating finger 109, is carried within housing, 106. An actuating tube 110, including transverse outwardly projecting flanges 111 and 112, is slidably disposed in openings 105 and 107 for movement between an upper position, in which flange 111 engages the top wall of housing 106, and the upper end portion of the tube projects thereabove, and a lower position, in which flange 112 engages cover 104. Downward movement of tube 110 from its upper position to its lower position results in actuation of switch 108, caused by engagement of flange 111 with operating arm 109. Shaft 113, carrying a follower piston 114, extends freely through tube 110. A stop collar 115 is rigidly attached to the upper end portion of shaft 113.

Figure 14:
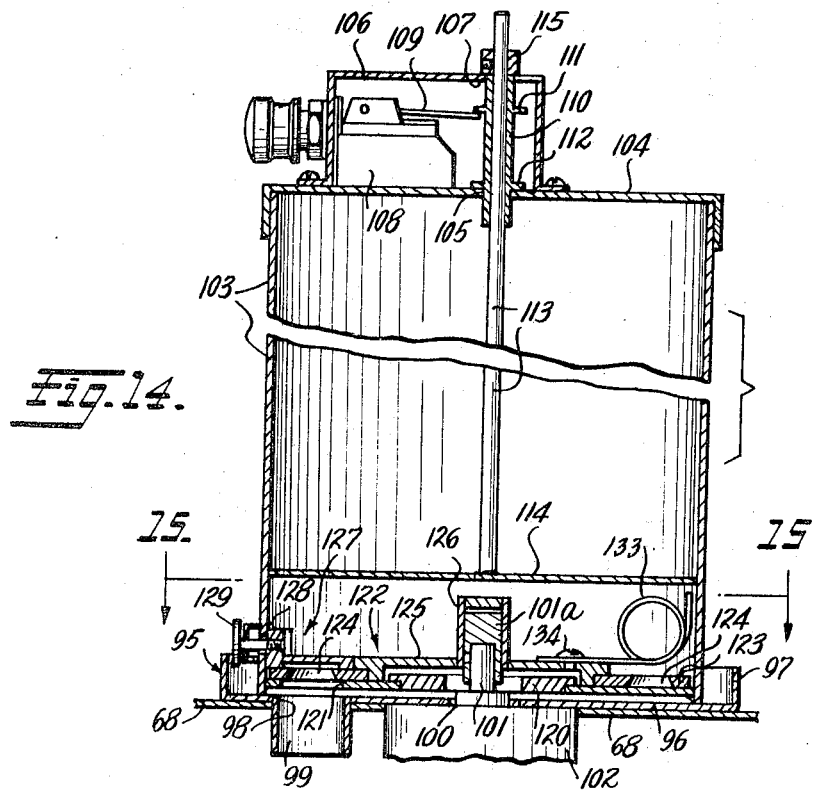
FIG. 14 is a vertical sectional view of one of the feeding units employed in the apparatus of FIGS. 3 and 4.

Secured in the open lower end of hopper member 103 is a flat circular disc 120 having a single circular discharge opening 121, FIG. 14, located near the periphery of the disc, and a central opening of sufficient diameter to freely pass the shaft 101 of motor 102. In the assembled unit, disc 120 is a stationary member fixed in place, for example, by being welded about its periphery directly to the wall of member 103. The location of opening 121 is such that, while hopper member 103 is being put in place on pan 95, the opening 121 can be registered immediately above delivery tube 99, as seen in FIG. 14. Shaft 101 includes an enlarged upper end portion 101a of such length as to project a significant distance upwardly into the interior of hopper member 103 and above disc 120. A metering rotor, indicated generally at 122, is driven by shaft 101 and comprises a flat annular peripheral portion 123 provided with a plurality of circular metering pockets 124 which are equally spaced in a circular series and so disposed that the pockets are brought into successive registry above opening 121 once during each revolution of rotor 122. Annular portion 123 is carried by a circular hub 125 provided with a square, axially extending central portion 126 which embraces and is secured to the square upper end portion of shaft 101. Portion 123 is of significant thickness, so that the metering pockets 124 are capable of containing and conveying a significant predetermined quantity of particulate material. The circular wall of each pocket is frusto-conical, tapering downwardly and outwardly. The lower face of annular portion 123 is in direct sliding engagement with the upper face of disc 120.

Since the material handled by unit 3 is frequently of very finely particulate form, and of such nature as to tend to cake, an ejection device, indicated generally at 127, FIG. 14, is provided. Device 127 includes an arcuate body member 128, secured directly to the wall of member 103, as by screw 129, body 128 defining a downwardly opening recess 130. A spring arm 131, FIG. 16, is located in recess 130 and is secured at one end to body member 128, the other end portion 132 of arm 131 having a downwardly directed circular portion dimensioned to project downwardly into the metering pockets 124 whenever one of such pockets is brought into registry with discharge tube 99. Spring arm 131 has a relaxed condition such that the ejector end portion 132 will be forced into each pocket 124 as that pocket arrives at the proper position. Arm 131 is sufficiently resilient, and recess 130 sufficiently deep, to allow the ejector end portion 132 to be cammed upwardly and ride along the upper surface portions of member 123 which are intermediate the adjacent pairs of metering pockets 124.

In order to stir and keep free-flowing the particulate material immediately above rotor 122, an agitator 133 in the form of a single turn torsion spring is employed, one end portion of the spring being elongated and clamped to the hub 125, as by screw 134, and the other end of the spring being extended along a line generally at right angles to the first end, so as to project adjacent the wall of member 103 in the fashion seen in FIG. 14.

Prior to operation of the apparatus, the combination of cover 104, housing 106, and follower piston 114 is removed, hopper member 103 is filled with the particulate material which feeding unit 3 is to handle, and cover 104 is then replaced. As the cover is replaced, shaft 113 is forced upwardly, due to engagement of the follower piston with the material in hopper member 103, piston 114 coming to rest substantially against the lower surface of cover 104, and sleeve 110 therefore being forced to its uppermost position with flange 111 engaging the top wall of housing 106, operating finger 109 of switch 108 therefore being allowed to return to its normal position under spring bias afforded conventionally in the switch. Switch 108 is connected to conventional electrical control means (not shown) for controlling operation of motor 102, and the control means is so constructed and arranged that motor 102 will be energized when the operating arm 109 of switch 108 is in its normal position, but de-energized when operating arm 109 has been actuated to its second position as a result of downward movement of flange 111 when follower 114 has descended to its lowermost position, seen in FIG. 14.

With hopper member 103 full of material, the particulate material will gravitate into all of the metering pockets 124 save for those which are covered by body member 128. Initial rotation of rotor 122 results in prompt and complete filling of all of the pockets 124. Then, as rotation continues at a constant rate, pockets 124 are brought successively into registry with tube 99 and the ejector end portion 132 of device 127 serves to eject the material downwardly from the pocket, assuming that full release does not occur gravitationally. The material released from each pocket descends through opening 121 and then through tube 99.

SUPPLY OF MATERIALS FROM UNITS 2 AND 3 TO MIXING ASSEMBLY 1

Supply of particulate materials from the two feeding units 2, 3, is accomplished via the duct assembly seen in FIGS. 17–19. Indicated generally at 135, this assembly comprises shorter tubes 136 and 137 and a longer tube 138. Tubes 136 and 137 are of the same length and are secured rigidly together by two transverse plates 139 and 140. Plate 139 is simply welded to the two tubes 136 and 137 near the upper ends thereof. Plate 140 is of larger plan extent and includes two circular openings respectively sized to receive the lower end portions of tubes 136 and 137, the plate being secured to the two tubes by a weld extending around each opening, as will be apparent from FIG. 18. Plate 140 extends at right angles to the axes of tubes 136 and 137 and is so disposed that only a short tip portion of the two tubes depends below the plate. Plate 140 is equipped with a rotatable catch 141, later described.

Immediately above plate 140, there is rigidly attached between tubes 136 and 137 a third plate 142 to which is secured an angle bracket 143. The longer third tube 138 is rigidly secured in the assembly by a flexible metal band 144 which extends completely around the combination of tube 138 and the upstanding portion of bracket 143. An upwardly projecting hook 145 is also fixed to plate 142.

The upper ends of tube 136 and 137 are plain and have an inner diameter slightly larger than the outer diameters of discharge tubes 73 and 99, respectively. The assembly of tubes 136–138 is installed simply by slipping the upper end portions of tubes 136 and 137 upwardly and telescopically over the dependent discharge tubes 73 and 99, respectively, and then connecting a tension spring 146, FIG. 17, between floor 68 and hook 145. Association of the tubes 136–138 with their respective delivery points will be later described.

RECYCLE FEEDING UNIT

Recycle unit 4 feeds measured quantities of ground recycle material from supply hopper 150 to a cascade hopper 5a via a metering device, indicated generally at 151, and tube 138. Hopper 150 is located beside hopper 89, the two hoppers being secured together and mutually supported by uprights 90. Metering device 151 comprises a horizontal cylinder 152, FIGS. 20 and 21 having an inlet opening 153 and an outlet opening 154, cylinder 152 being located immediately above the top 85 of feed unit 2, with inlet 153 directed upwardly and outlet 154 directed downwardly. The dependent discharge end 155 of hopper 150 has its lower edge welded to the body of cylinder 152 along the circular edge which defines inlet opening 153, this welded connection constituting the mechanical support for cylinder 152.

Cylinder 152 is a right cylindrical body, the left (as viewed in FIGS. 20 and 21) end thereof being closed by a removable retainer cap 156, cap 156 defining a central opening 157 and supporting an annular resilient stop member 158. Operatively disposed in cylinder 152 is a piston indicated generally at 159 and carried by a piston rod 160 which is threaded throughout its length and extends freely through opening 157. Piston 159 includes a flexible cup member 161 having a flat circular wall portion 162 with a central opening through which the piston rod extends, a gradually tapering frustoconical main wall portion 163, and an annular outwardly projecting lip portion 164. Wall portion 162 is transverse to rod 160 and its diameter is smaller than that of the cylinder. Portion 163 tapers outwardly from portion 162 toward the cylinder, and the outer periphery of lip portion 164 slidably engages the inner surface of cylinder 152. On the right hand side of portion 162 (as viewed), rod 160 carries a relatively thick rigid support washer 165 which is of significantly smaller outer diameter than the flat portion 162 of the cup member, support member 165 being in direct flush engagement with wall portion 162. On this side of wall portion 162, there are also provided a lock washer 166 and a nut 167. On the other side of wall portion 162, the wall portion is engaged by a relatively thick rigid support washer 168 which has a diameter equal to the diameter of wall portion 162. The piston assembly is completed by a jam nut 169 which engages the outer face of support washer 168. Piston unit 159 is disposed at a selected position along rod 160 and is fixed in that position by a weld, indicated at 170, between nut 167 and rod 160. Under normal operating circumstances, piston 159 is located in an intermediate area of the piston rod, so that a substantial portion of the rod projects from the piston inwardly into the cylinder, and a major portion of the rod projects from the piston outwardly beyond retainer cap 156.

Reciprocation of the piston rod 160 and piston 159 is accomplished in timed relation to operation of feed unit 2 by a linkage, indicated generally at 174, FIGS. 20–22, and comprising a push rod 176, operating in slide bearing 77, and a lever 177. As best seen in FIG. 23, push rod 176 includes a rod portion 178 of smaller diameter, an enlarged piston-like portion 179, and an axially projecting flat end portion 180. Slide bearing 77 includes a right-cylindrical bore portion 181 which opens through one end of the bearing and slidably embraces portion 179 of the push rod, and a smaller diameter portion 182 which opens through the opposite end of the bearing and slidably embraces portion 178 of the rod. A helical compression spring 183 is disposed between the inner end of rod portion 179 and the shoulder which joins bore portions 181 and 182, so that the spring urges the push rod to the right, as viewed in FIG. 23. Rigidly secured to flat end portion 168 of the push rod is the combination of a shaft member 184 and two rollers 185 which, as will be described, function as cam followers to be engaged by the band clamps 84a of sealing rings 84 as metering rotor 78 of feed unit 2 turns. Shaft member 184 extends completely through and is secured rigidly to flat portion 180 and rollers 185 are located each on a different side of portion 180. Rollers 185 are supported for free rotation.

Lever 177 comprises two flat rigid arms 188, FIG. 22, maintained in parallel spaced relation by spacers 189. At a point near one end of the lever, arms 188 carry a transverse pivot pin 190. The lever is supported by a stationary arm 191 welded at one end to the body of slide bearing 77 and projecting upwardly and outwardly away from the closure plate 76 on which the slide bearing is mounted. At its outer end, arm 191 rigidly carries a sleeve bearing 192 in which pivot pin 190 is journalled, the arrangement being such that the sleeve bearing and pivot pin define a pivotal axis for lever 177 which is below and at right angles to the piston rod 160.

At its outer end, push rod 176, FIG. 23, is equipped with a connecting block 193 which extends transversely of the push rod and has a slot at each of its ends, the slots respectively defining two pin portions 194 which are coaxial to each other and extend transversely of the push are bifurcated and embrace the pin portions 194, as shown in FIGS. 20–22.

At its outer end, piston rod 160 carries the combination of an adjusting nut 196, a guide tube 197, a lock washer 198 and a wing nut 199, the guide tube being locked rigidly between adjusting nut 196, on the one hand, and the combination of washer 198 and wing nut 199, on the other hand. The diameters of adjusting nut 196 and lock washer 198 are substantially larger than the outer diameter of guide tube 197. A connecting block 200 is slidably carried by guide tube 197, the connecting block having a through bore and the guide tube extending slidably through the through bore, the arrangement being such that the connecting block extends transversely of the guide tube. The connecting block is slotted at each end with the slots defining pin portions 201, FIG. 22. The upper end portions 188b of arms 188 of lever 177 are bifurcated, extending into the respective slots and embracing pin portions 201, as shown in FIG. 21.

A helical compression spring 202 surrounds guide tube 197, the ends of the compression spring respectively engaging adjusting nut 196 and the corresponding end of connecting block 200. The strength of compression spring 202 is such that, so long as piston 159 is reasonably free to move in cylinder 152, the combination of lever end portions 188b, connecting block 200, tube 197, and nuts 196, 199, is effective to provide a simple pivotal connection between lever 177 and piston rod 160. However, in the event of unusual resistance to movement of piston 159 inwardly in cylinder 152, at a time when lever 177 is urged to pivot clockwise, as viewed in FIGS. 20 and 21, spring 202 yields to prevent jamming of the apparatus.

As will be clear from FIGS. 20 and 21, taken in view of FIG. 23, compression spring 183, FIG. 23, is effective to move push rod 176 to the right (as viewed), and therefore pivot lever 177 counterclockwise (as viewed), so that piston rod 160 is at the limit of its travel to the left (as viewed), so long as disc 79 of feed unit 2 is in a position such that rollers 185 are not engaged by one of the drop tube sealing rings 84. However, as disc 79 rotates, each drop tube sealing ring 84 travels through the position normally occupied by rollers 185. Rollers 185 directly engage the stainless steel band clamps 84a so that, as the drop tube sealing ring moves past this position, push rod 176 is cammed to the left (as viewed), causing lever 177 to swing in a clockwise direction and move piston rod 160 to the right to the extent seen in FIG. 20. When the drop tube sealing ring has passed, spring 183 returns the push rod, lever and piston rod to their original positions, seen in FIG. 21.

With piston 159 in the position seen in FIG. 21, the ground recycle material in hopper 150 is allowed to gravitate through inlet opening 153 into the interior of cylinder 152, providing a mass of recycle material with the shape of the mass depending upon the angle of repose for the particular material involved. The dimensions of cylinder 152 are such that this gravitationally formed mass of material does not extend to outlet opening 154 of the cylinder. Movement of piston 159 to the right, resulting from passage of one of the drop tube sealing rings 84 past rollers 185, shifts the material of this mass to the right, causing a measured quantity of material to cascade over the edge of outlet opening 154.

Outlet opening 154, FIGS. 20 and 21, is defined by an edge 203 lying in a plane at right angles to the axis of the cylinder, edges 204 lying in a common horizontal plane, and a flat end plate 205. Provision of edge 203, lying entirely in a plane transverse to the cylinder, is advantageous in that it assures that all particulate material which advances as far as this edge, as a result of inward movement of the piston, will cascade through outlet opening 154, there being essentially no tendency for material to collect at the edges of the outlet opening in a fashion which would tend to cause material build-up and jamming of the piston. Plate 205 depends below cylinder 152 and cooperates with a formed wall member 206 to provide a downwardly tapering conduit portion which is welded to a short cylindrical tubular portion 207 of such outer diameter as to be received telescopically within the upper end of regrind delivery tube 138, FIG. 17.

Provision of cup member 161 as the primary portion of piston 159 is particularly advantageous in view of the nature of the ground recycle material to be handled. As to movement of the piston to the right (as viewed), wall portion 162 of cup member 151 is rendered essentially rigid. The frusto-conical wall portion 163 of the cup member, however, is relatively flexible, so that some compliance is provided in the event of excessive resistance presented by the particulate material. Thus, the nature of the thin flexible cup member is such that, insofar as movement of the piston in a material feeding direction is concerned, a significant overload resistance can be tolerated without requiring hesitation of the piston. When the piston is moved in the opposite direction, the fact that support washer 165 is smaller than support washer 168 allows the outer peripheral portion of wall 162 to flex on the return stroke. Accordingly, any particles or fragments of recycle material which might become caught between the peripheral flange 164 and the wall of cylinder body 152 are carried to the left (as viewed in FIGS. 20 and 21) during the return stroke of the piston, are released by flange 164 during a subsequent forward stroke of the piston, and thus are freed in the space to the left of the piston for escape from the cylinder 151 via the enlarged opening 157.

Cup member 161 can be formed, for example, from polyethylene or polypropylene of such relatively small thickness as to provide the desired flexibility. Thus, for example, for a 3″-diameter cup, the wall of member 161 can be on the order of .030″, for optimum strength and flexibility characteristics. Use of polyethylene, polypropylene or like low-friction polymeric materials for the cup member provides low-friction engagement between lip portions 164 and the inner surface of the cylinder.

COMBINING THE MATERIALS DISCHARGED BY MIXING UNIT 1 AND RECYCLE UNIT 4

Cascade hopper 5a, FIGS. 3, 4 and 17, is of elongated rectangular top plan form and is secured to housing member 6 in such fashion that hopper 5a and housing member 6 can be moved as a unit about the pivotal axis determined by post 50. One end portion 210 of the top of hopper 5a is engaged with that portion of the bottom wall of housing member 6 which contains opening 58, and the top wall of hopper 5a is provided with a like opening in registry with opening 58. The outer end portion 211 of the top of hopper 5a projects beyond the periphery of housing member 6 to a location such that when mixing unit 1 is in its operating position, end portion 211 of the cascade hopper is disposed beneath recycle discharge tube 138. At end portion 211, the top wall of hopper 5a is provided with an opening the wall of which slidably embraces the lower end of tube 138 when the tube is in its operative position.

End walls 212 and 213 slant downwardly and inwardly from end portions 210 and 211, respectively, the bottom portions of the walls of the cascade hopper being curved to provide a circular discharge end 214 which registers with the circular mouth of hopper 5, hoppers 5a and 5 being secured together by band clamp 215 when mixing unit 1 is in its operative position. Recycled material descending through tube 138 impinges on slanting end wall 213 of hopper 5a and is deflected laterally toward wall 212. Similarly, mixed material discharged from unit 1 falls onto slanting wall 212 and is deflected laterally toward wall 211. The resulting cascade action blends the recycled material with the mixed material from unit 1, so that a uniform mixture is supplied to hopper 5.

In use, the frame 45 is mounted at the apparatus to which the mixture is to be supplied from hopper 5. Thus, in the case of an extruder, for example, the frame 45 is so positioned that hopper 5 can discharge directly into the extruder feed.

CLEANING AND REASSEMBLY

When, as because of a change in the colorant to be used, the apparatus is to be cleaned, transfer tube assembly 135 is released from engagement with mixing unit 1, pin 55, FIG. 9, is removed, band clamp 215, FIG. 4, is released, and mixing unit 1, along with cascade hopper 5a, is swung outwardly until the housing member 6 occupies the position shown in dotted lines in FIG. 8. Band clamp 11 is then released, cover 10 is removed, and all of rotors 20–22 and pans 7–9 are simply lifted out of housing member 6. The motors and pans can be washed or replaced by clean identical units at hand so that operation of the apparatus need not be held up for cleaning. With the rotors and pans again in place, cover 10 is re-applied and secured by clamp 11. Mixing unit 1 is then swung back to its operative position, returning hopper 5a to its location above hopper 5, and clamp 215 is re-applied. The tube assembly 135 is then lowered, against the tension of spring 146, until the lower ends of tubes 136 and 137 are engaged in openings 60 and 61, respectively, of cover 10, and the lower end of tube 138 is engaged in its cooperating opening in end portion 210 of cascade hopper 5a. At this point, catch 141, FIG. 18, is turned to bring its finger 141a into engagement beneath a retainer 220, FIG. 13, carried by cover 10 of mixing unit 1. Pin 51, FIG. 9, is reinserted.

Feed unit 3 can be removed simply by lifting the member 103 away from pan 95, and is taken apart by removing cover 104, shaft 113 and follower 114, then removing screw 129, and finally removing rotor 122.

OPERATION

Figure 2:
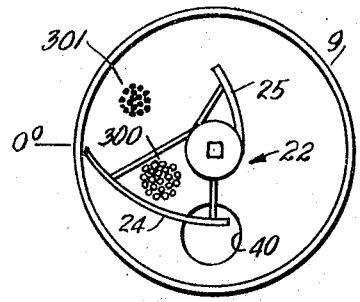
FIGS. 2–2H are sequence diagrams illustrating one manner in which the invention is practiced.

FIGS. 2–2H illustrate operation of the apparatus of FIGS. 3–23, with feed unit 2 employed to supply, e.g., successive measured quantities of virgin polymeric material in particulate form and feed unit 3 operated to supply successive measured quantities of, e.g., a dry colorant of a particle size markedly smaller than that of the virgin material. FIG. 2 illustrates the upper pan 9 of mixing assembly 1 at an initial stage of the operation, a first quantity of virgin polymeric material having been deposited onto the bottom of the pan at a location 300 which is adjacent the discharge opening 40 of the pan and spaced a small distance therefrom in the direction of rotation of mixing and advancing unit 22, FIG. 7, location 300 being spaced somewhat inwardly from the center line of the annular mixing zone defined by pan 9 and being of such extent that the deposited material occupies a substantial portion of the width of the mixing zone. At a time which, for purposes of simplicity, can be considered as substantially concurrent with deposition of the virgin material at location 300, a first quantity of the dry colorant material is deposited from feed unit 3 onto the bottom of pan 9 in a second location 301 which is spaced a relatively small distance from location 300 in the direction of rotation of unit 22 and also in a direction which is outwardly from location 300. Again for purposes of simplicity, assume that unit 22 is in the initial position seen in FIG. 2, with its outboard arm 24 just approaching location 300 and with its inboard arm 25 well beyond location 301, so that outboard arm 24 will be the first to act upon the material in locations 300 and 301.

Figure 2A:
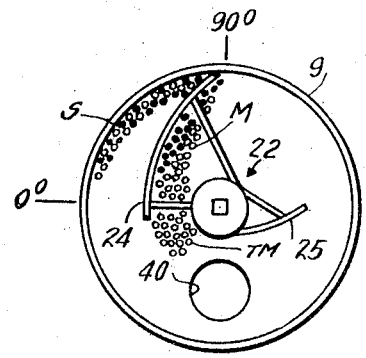
Figure 2B:
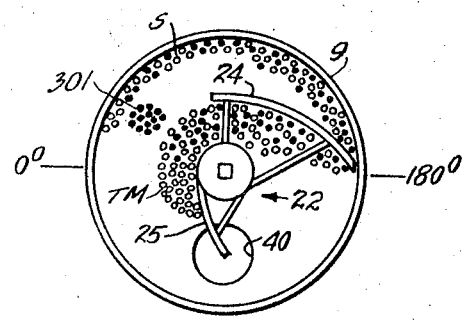

As outboard arm 24 advances and engages the material in locations 300 and 301, the arm moves the material in both locations forwardly along the mixing zone, over the stationary bottom of pan 9, the concave form of the arm and its outwardly and forwardly slanting disposition causing the two quantities of material to be initially combined into a dynamic tumbling leading mass M, FIG. 2A, of particles, which mass extends generally transversely across the intermediate and outer portions of the zone. Because of the configuration of the outer tip of arm 24, and the relation of the outer tip to the outer wall of pan 9, continued movement of arm 24 causes a minor proportion of the material at the outer end portion of mass M to be diverted as a residual stream along the outer periphery of the mixing zone defined by pan 9. Such diversion is accomplished by flow of the particulate material from the mass over the downwardly and outwardly slanting edge portion 37, FIG. 10, of the tip of arm 24, with the result that the residual stream S, FIG. 2A, trails behind the outer tip of the arm. Simultaneously, a larger portion of the material of mass M is diverted by the inner end portion of arm 24 toward the hub of the pan, so that a trailing mass TM, FIGS. 2A and 2B, is left along the inner periphery of the mixing zone. Considering that portion of one cycle of rotation of unit 22 illustrated by FIGS. 2A and 2B, the trailing mass TM can be considered as residing in that part of the inner periphery of the mixing zone extending from approximately location 300 to a point well beyond location 301.

Figure 2C:
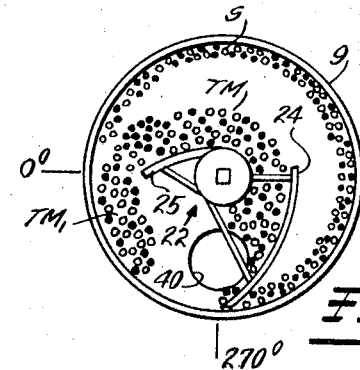
Figure 2D:
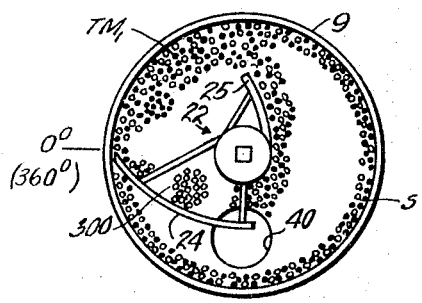
Figure 2E:
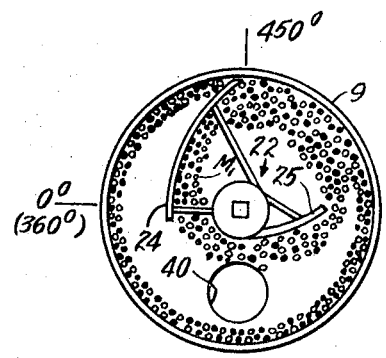

Turning now to FIGS. 2C and 2D, it will be seen that further rotation of unit 22 causes the inboard arm 25 to pass locations 300 and 301, the convex and outwardly and rearwardly slanting disposition of the inboard arm serving to deflect the trailing mass TM outwardly across the mixing zone, so that the portion $TM_1$ now extends along the outer portion of the mixing zone, that is, that portion from the outer tip of inboard arm 25 to the peripheral wall of pan 9. Comparing FIGS. 2C, 2D and 2E, it will be evident that the action of inboard arm 25 serves both to reposition trailing mass TM relative to the path of travel of outboard arm 24 and also to combine material of the trailing mass TM with the material of the residual stream S.

Comparing FIGS. 2C and 2D, it will be seen that, as the outboard arm 24 approaches location 300, the outer end portion of the outboard arm begins to advance that portion of trailing mass TM which has been deflected to the outer periphery of the mixing zone, continued rotation of unit 22 causing the outboard arm to advance that material in combination with the corresponding portion of residual stream S. Meanwhile, in typical operations according to the method, an additional quantity of virgin polymeric material has been deposited at location 300. Accordingly, as seen from FIGS. 2E and 2F, the dynamic tumbling leading mass $M_1$ is again established by outboard arm 24 and now comprises a mixture of some of the originally deposited material in the original leading mass M, a major proportion of that part of the trailing mass TM which was deflected by arm 25 during the previous revolution, a corresponding amount of the residual stream S, and the newly deposited particulate material. Considering FIGS. 2E–2F, continued rotation of unit 22 again causes continuous diversion of a minor part of the outer end portion of the leading mass into residual stream S, and diversion of a major portion of the leading mass into the trailing mass TM along the inner periphery of the mixing zone.

At this stage of the method, it will be seen that the residual stream S actually constitutes a continuous recycle of mixed particles, while the manipulation of the trailing mass, laid down first along the inner periphery and then diverted to the outer portion of the mixing zone, assures maximum interchange between the separately deposited portions of the virgin polymeric material and the colorant.

Both arms 24 and 25 serve to effect dynamic tumbling of the particles, in addition to the advancing and deflecting operations, and provide a substantial mechanical working of the particulate material.

During each rotation of unit 22, the outboard arm 24 advances a portion of the leading mass M into the area occupied by discharge opening 40 of pan 9, and the corresponding amount of the leading mass is discharged through opening 40. Similarly, inboard arm 25 sweeps some of the particulate material into discharge opening 40 during each revolution of unit 22. Though the first few revolutions, e.g., up to 3 or 4, of unit 22 are only preliminary, so that the material discharged through opening 40 is not extensively mixed, an equilibrium situation is quickly reached in which extensive mixing of the two particulate materials in the mixing zone afforded by pan 9 is accomplished. Referring again to FIG. 7, the materials so mixed of course discharge through opening 40 into the next lower mixing zone, afforded by pan 8, and mixing is accomplished in that mixing zone by unit 21 in the same manner hereinbefore described with reference to FIGS. 2–2H, save that introduction of material to this mixing zone is solely via the single discharge opening 40 of pan 9. The material mixed in the annular mixing zone afforded by pan 8 is discharged through opening 40 of that pan into the zone afforded by pan 7, and the same mixing operation repeated, the fully mixed material then being discharged via opening 40 of pan 7 and opening 58 of housing member 6.

In a typical operation for mixing virgin resin and a dry colorant, the units 20–22 were operated at 112 r.p.m. with feed unit 2 operating to provide 120 sequential quantities of virgin resin per minute and feed unit 3 operating to provide 80 sequential quantities of colorant per minute. Under normal circumstances met with in mixing particulate materials, and employing three mixing stages, units 20–22 can be rotated at 50–200 r.p.m., with 95–120 r.p.m. being optimum for application wherein a colorant is one of the particulate materials and color development is required. The number of sequential quantities of the materials to be mixed can vary widely. Where the mixture is to include one material which is predominant, as in the case of mixing a polymeric material with a colorant or an additive, optimum results are obtained when approximately one quantity of the predominant material is introduced during each revolution of units 20–22. Under such circumstances, the number of sequential quantities of additive material, e.g., colorant, introduced per revolution of units 20–22 can be in the range of 1–400.

APPARATUS EMBODIMENT OF FIGS. 24 AND 25

Figure 24:
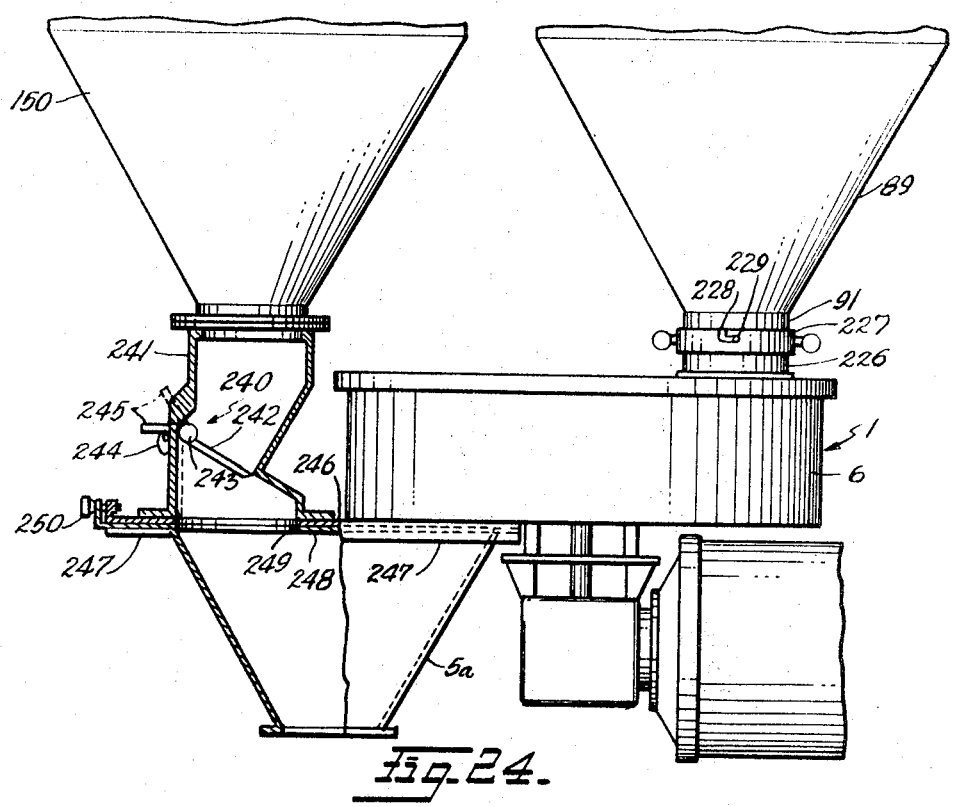
FIG. 24 is a view, partly in side elevation and partly in vertical section, of an apparatus according to another embodiment of the invention.
Figure 25:
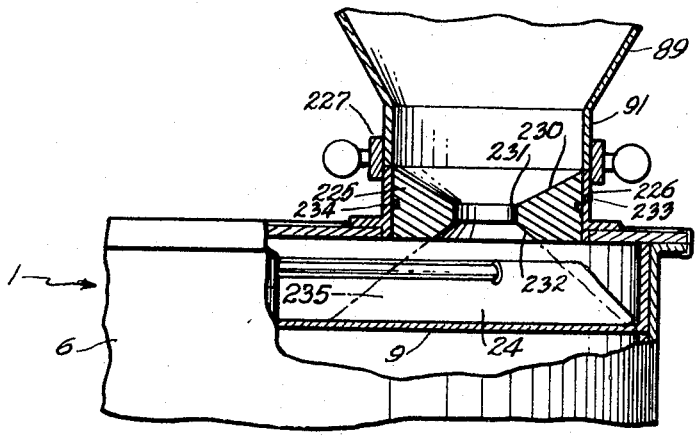
FIG. 25 is an enlarged fragmentary view, partly in side elevation and partly in vertical section, of a portion of the apparatus of FIG. 24.

FIGS. 24 and 25 illustrate another embodiment of the apparatus, based on the mixing unit 1 of the embodiment of FIGS. 1–23, identical parts being indicated by the same reference characters employed in those figures. In this embodiment, the particulate material from hopper 89 is supplied directly to mixing unit 1 solely by gravity, providing a mass of such material in pan 9 the amount of which is determined by the flow characteristics and angle of repose of the material, and upon the inner diameter of an orifice member 225 interposed below the supply hopper.

The discharge end 91 of hopper 89 is connected to a tube 226 of like diameter which is welded to cover 10 of the mixing unit, the connection being by way of a ring 227 having J-slots 228 cooperating with pins 229 on member 91. Tube 226 has its lower end engaged in opening 60 of cover 10. Orifice member 225, FIG. 25, is in the nature of a venturi throat consisting of an annular member with a downwardly and inwardly tapering frustoconical upper surface 230, a cylindrical intermediate surface 231 defining the aperture, and a downwardly and outwardly tapering frusto-conical lower surface 232, the member being secured to tube 226, as by a set screw 233, and sealed thereto, as by an O-ring at 234.

Particulate material flowing by gravity from hopper 89 through member 225 appears in pan 9 as a generally conical mass 235, FIG. 25, a major portion of that mass being moved away by arm 24 during each rotation of unit 22, and the mass 235 being reestablished by gravitational flow as soon as arm 24 has passed. Within practical limits, arm 24 advances the same quantity of particulate material from mass 235 each time the arm passes through the mass.

Figure 15:
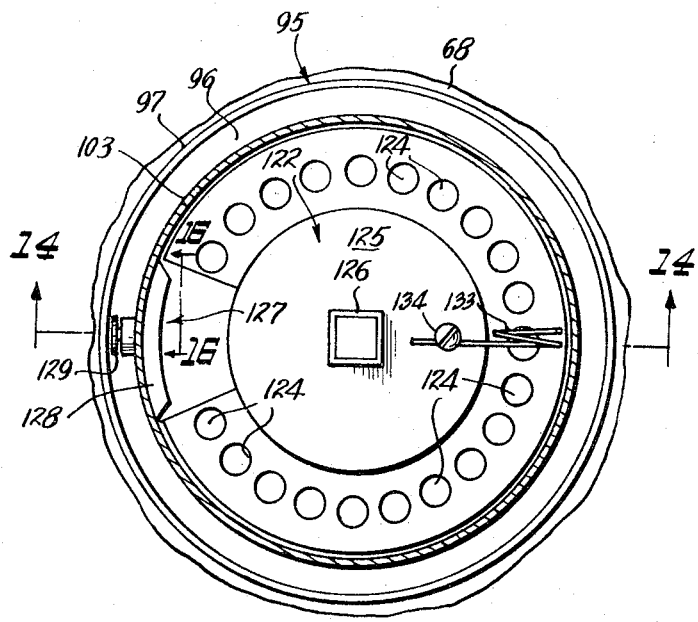
FIG. 15 is a transverse sectional view taken generally on line 15—15, FIG. 14.

The second particulate material to be mixed can be supplied to unit 1 in any suitable fashion, as by the feed device of FIGS. 14 and 15.

Recycle material is supplied from hopper 150 via a simple cam operated metering valve indicated generally at 240 and comprising an upright tubular body 241 across the interior of which is interposed a flat valve member 242. Valve member 242 is pivoted on a transverse shaft 243 at one side of body 241 and is so shaped and dimensioned as to be capable of bridging the interior of body 241 when occupying the position shown in solid lines in FIG. 24, flow of recycle material being cut off when the valve member is in that position. When shaft 243 turns in a clockwise direction (as viewed), valve member 242 is swung to the open position shown in broken lines in FIG. 24. The valve member is pivoted by a cam 244 engaging a bar 245 secured to and extending radially from shaft 243. Cam 244 can be rotated by any suitable control device (not shown) such that a predetermined number of revolutions during, e.g., each revolution of the rotors of mixing unit 1, each revolution of the cam resulting in actuation of valve member 242 to its open position for a predetermined short period of time and therefore allowing a predetermined quantity of recycle material to flow through body 241 by gravity.

Body 241 is mounted directly on a plate 246 secured to the bottom wall of housing 6 of unit 1. The longitudinal edges of plate 246 are turned downwardly and inwardly, as indicated at 247, to provide a retaining slideway in which laterally projecting longitudinal edges of top wall 248 of cascade hopper 5a are engaged. Top wall 248 has an opening 249 which is registered with the bottom opening of body 241 and a like opening in plate 246 when the cascade hopper is fully inserted in the slideway provided by plate 246. The cascade hopper is releasably retained in that position by a screw 250 engaged in a coacting nut carried by an upturned edge of plate 246. The opposite end of hopper 5a communicates with the discharge opening of mixing unit 1, when the hopper is in the position seen in FIG. 24, in the same fashion hereinbefore described with reference to FIGS. 3, 4 and 17. With this means for mounting hopper 5a, which also can be employed in the apparatus of FIGS. 1–23, the hopper 5a can be removed during operation of the mixing apparatus so that separate samples can be taken of the mixed material discharged from mixing unit 1 and the recycle material.

What is claimed is:

1. In a mixing apparatus, the combination of
   frame means;
   a mixing unit mounted on said frame means for movement between a first position and a second position;
   material supply means carried by said frame means and operatively positioned to supply materials to be mixed to said mixing unit when said mixing unit is in said first position; and
   delivery means mounted on said frame means and operatively disposed to receive mixed material from said mixing unit when said mixing unit is in said first position;
   said mixing unit comprising
      a housing comprising a main housing member defining a circular chamber, and a top removably secured to said main housing member to close said chamber,
      a plurality of open-topped circular pans disposed in said chamber in an upright series, each of said pans having a central opening,
      a rotary drive shaft extending freely through said openings, and
      a plurality of rotary agitators each disposed in a different one of said pans and each including a hub having an opening through which said shaft slidably extends in driving engagement with the agitator;

said top, said agitators and said pans being removable from said main housing member when said mixing unit is in said second position.

2. The combination defined in claim 1, wherein each of said pans comprises a flat circular bottom wall and a cylindrical outer wall, the outer peripheral portions of the bottom walls of upper ones of said pans each resting on the upper edge of the outer wall of the next lower one of said pans, the lower one of said pans resting on the bottom wall of said main housing member, the bottom wall of each of said pans including a central hub, the hub of each of said agitators slidably engaging the top of the hub of the one of said pans in which the agitator is disposed.

3. The combination defined in claim 1, and further comprising means secured to said frame means and constituting a pivot bearing having a vertical axis, and means secured to said main housing member and operatively engaged with said last-mentioned means to support said mixing unit for swinging movement about said axis between said first and second positions.

4. The combination defined in claim 1, wherein each of said pans comprises a flat circular bottom and a cylindrical outer wall, the outer peripheral portions of the bottom walls of upper ones of said pans each resting on the upper edge of the outer wall of the next lower one of said pans, the lower one of said pans resting on the bottom wall of said main housing member, the bottom wall of each of said pans having a discharge opening through which material can pass to the next lower pan, each of said pans having a locator pin and a locator bore, said pans being identical and said pins and bores being so located that, when said locator pins of one pan are engaged respectively in said locator bores of adjacent pans, said discharge openings are angularly displaced from each other.

5. The combination defined in claim 4, wherein said bottom wall of said main housing member has a discharge opening and a locator bore so angularly related that, when a locator pin of the lower one of said pans is engaged in the locator bore of the bottom wall of said main housing member, the discharge openings of said lower one of said pans and said bottom wall of said main housing member will be registered with each other.

6. The combination defined in claim 4, wherein said top of said housing is provided with at least one material introduction opening and also comprises locator means operative to cooperate with locator means on the uppermost pan to so position said top that said at least one material introduction opening is angularly displaced relative to said discharge opening of said uppermost pan.

7. The combination defined in claim 1, wherein said material supply means comprises a plurality of dependent discharge ducts, and said top of said housing is provided with a plurality of material introduction openings disposed to be aligned respectively below said discharge ducts when said mixing unit is in said first position, the combination further comprising transfer duct means including duct members respectively telescopically engaging said discharge ducts, resilient means urging said transfer duct means upwardly to a position in which the lower ends of said duct members are disposed above said mixing unit so said mixing unit can be moved relative to said transfer means, and means for latching said transfer duct means to said mixing unit, with said duct members registered respectively with said material introduction openings, when said mixing unit is in said first position.

8. The combination defined in claim 7 and further comprising a discharge hopper carried by said mixing unit and including a first entry opening disposed to receive mixed materials from said mixing unit and a second entry opening spaced laterally from said mixing unit, said transfer duct means further comprising an additional duct member extending beside said mixing unit and communicating with said second entry opening of said discharge hopper when said mixing unit is in said first position.

References Cited

UNITED STATES PATENTS 3,494,412  2/1970  Abraham ---------- 259—8 X

WALTER A. SCHEEL, Primary Examiner

P. R. COE, Assistant Examiner

PO-1050
(5/69)

UNITED STATES PATENT OFFICE
CERTIFICATE OF CORRECTION

Patent No. 3,664,642          Dated May 23, 1972

Inventor(s) Joseph C. Morin

It is certified that error appears in the above-identified patent and that said Letters Patent are hereby corrected as shown below:

Column 1, line 21, --to-- should be inserted after "rotors".

Column 10, --rod. The corresponding end portions 188a of arms 188-- should be inserted after line 75.

Signed and sealed this 2nd day of January 1973.

(SEAL)
Attest:

EDWARD M. FLETCHER, JR.          ROBERT GOTTSCHALK
Attesting Officer          Commissioner of Patents